Jan. 1, 1946. O. W. LIVINGSTON 2,392,249
ELECTRIC TRANSLATING CIRCUIT
Filed Nov. 29, 1944
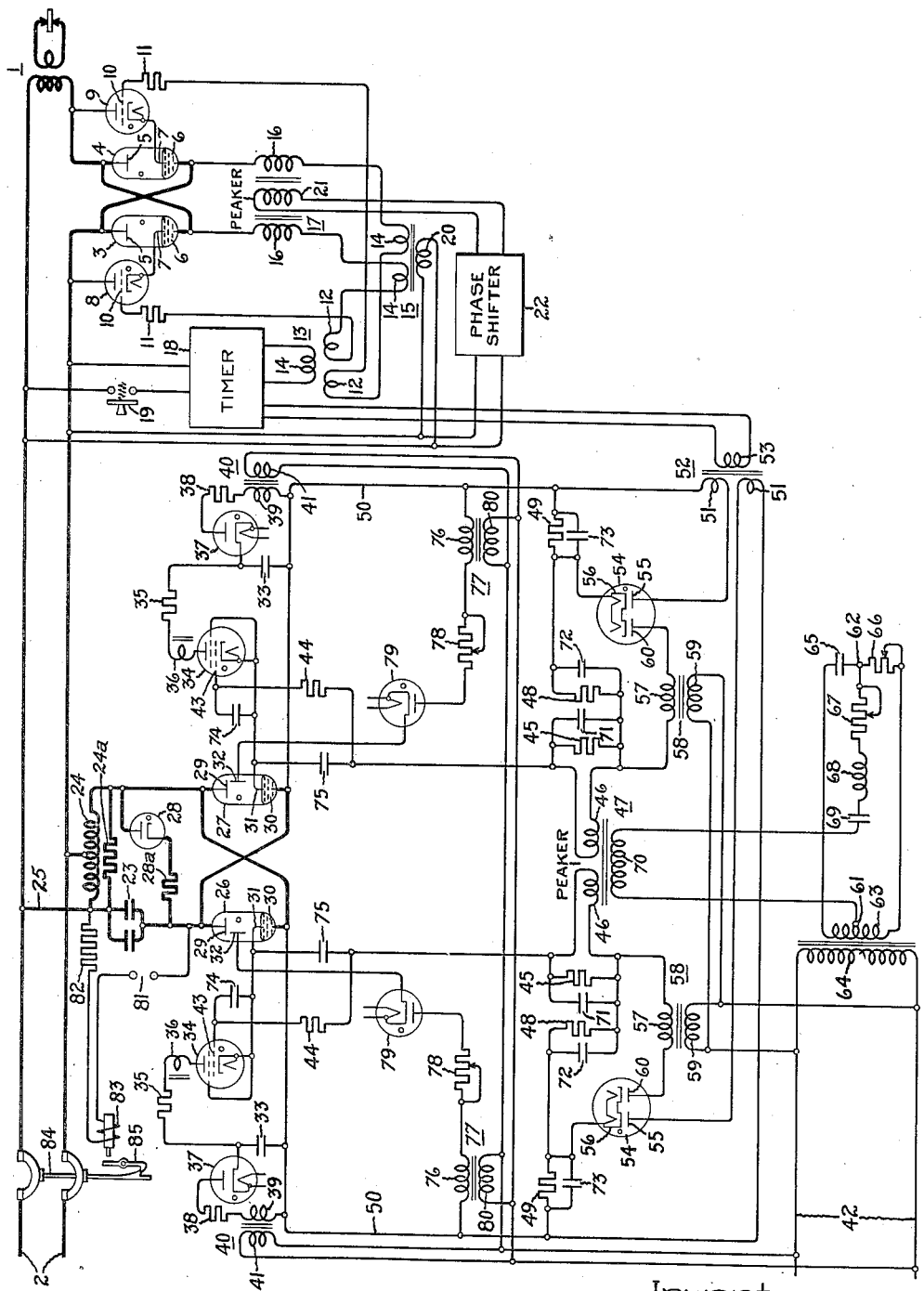
Inventor:
Orrin W. Livingston,
by Harry E. Dunham
His Attorney.

ary Jan. 1, 1946

2,392,249

UNITED STATES PATENT OFFICE 2,392,249

ELECTRIC TRANSLATING CIRCUIT

Orrin W. Livingston, Scotia, N. Y., assignor to General Electric Company, a corporation of New York Application November 29, 1944, Serial No. 565,776

6 Claims. (Cl. 172—246)

My invention relates to electric translating circuits and more particularly to improved translating apparatus for effecting intermittent energization of an inductive load circuit.

The intermittent energization of a low power factor load from an alternating current supply circuit causes undesirable voltage fluctuations and resulting light flicker and improper operation of electrical devices associated with the supply circuit. Resistance welding apparatus, for example, imposes a particularly severe demand on the supply circuit since it is a highly inductive load which is intermittently energized. In many installations, resistance welding systems have been provided with series power factor correction capacitors to minimize the demand on the supply circuit. In the use of series capacitors for this purpose, it is essential that the capacitors form with the inductance of the load circuit a resonant circuit tuned to the frequency of the supply. Since variations in the work circuit change the resonant frequency of the load circuit, it is apparent that adjustment during operation is required and accurate electrical data, which is not always readily available, is required for designing the power factor correction equipment. The use of shunt capacitors for power factor correction offers certain advantages in that the magnitude of the capacitance employed need not be accurately correlated with the inductance of the load circuit. To the extent that any capacitance is utilized, it is effective to supply a certain amount of power factor correction. However, arrangements hitherto employed for controlling the application of shunt capacitors have not been entirely satisfactory for use with intermittently energized loads.

It is an object of my invention to provide new and improved electric translating apparatus.

It is another object of my invention to provide a new and improved control system for effecting intermittent energization of a load circuit and for improving the power factor imposed on an alternating current supply circuit by the effective control of shunt capacitance.

In the illustrated embodiment of my invention, I have shown a resistance welding system including reversely connected electric valves which are controlled to transmit timed applications of current to a welding load circuit. In order to improve the power factor imposed on the alternating current supply circuit a bank of capacitors is provided and these capacitors are pre-charged to a voltage equal to the crest of the supply circuit voltage. The capacitors are connected to the supply circuit in shunt with the load circuit at the 90° point in the supply circuit voltage wave, thus providing transientless switching of the shunt capacitors. In order to effect the synchronous switching of the capacitors, reversely connected electric valves are employed. Since in the preferred embodiment the voltage of the capacitors is equal to the supply line voltage just prior to the instant of switching, no anode-cathode voltage exists across the switching valves. For this reason, I employ separate excitation circuits for the control electrodes which establish the cathode spots at the desired instants. In order that ionization may be maintained in the electric valves until sufficient voltage appears across the electric valves to render them conductive, a holding anode is provided in each of the valves. With this arrangement the switching electric valves are placed in a conductive condition at the desired instant in the voltage wave and are maintained in this state by the holding anodes so that the switching of the shunt capacitors is effected as soon as the voltage difference across the anode-cathode circuits of the switching valves is sufficient to initiate conduction. The capacitors are maintained charged to the crest value of the supply circuit voltage by a rectifier continuously connected across the capacitors. Since in the operation of the system the capacitors tend to charge in the desired direction due to the oscillatory character of the circuit in which they are connected, the primary function of the charging rectifier is to establish the desired voltage on the capacitor on the initiation of the first energization of the load circuit. The timing circuit employed for effecting energization of the load circuit is employed for determining the cycles during which the shunt capacitors are connected and a separate excitation circuit is provided for determining the instant in the voltage cycle that the switching operation of the capacitance is effected.

For a better understanding of my invention, reference may be had to the following description taken in connection with the accompanying drawing, and its scope will be pointed out in the appended claims. In the drawing, the single figure is a schematic representation of one embodiment of my invention applied to a resistance welding control system.

Referring now to the drawing, an inductive load, such as a resistance welding transformer 1, is connected for energization from an alternating current supply circuit 2 through a pair of electric valves 3 and 4 which are reversely connected in parallel between the supply circuit and the primary winding of the welding transformer. As illustrated, the valves 3 and 4 are of the type employing, in addition to an anode 5, a cathode 6 of conducting liquid and an immersion-ignitor type starting electrode 7. Current impulses for controlling the initiation of conduction of the electric valves 3 and 4 are supplied by firing electric valves 8 and 9 having their anode-cathode circuits connected, respectively, between the anodes and control members of electric valves 3 and 4. The electric valves 8 and 9 are preferably of the type employing an ionizable medium, such as a gas or vapor, and each includes a control member 10 for controlling the instant at which conduction is initiated. The circuits for energizing the control members 10 are identical and only one will be described.

Referring now to electric valve 8, the circuit of the control member 10 may be traced through a current limiting resistor 11, the secondary winding 12 of a transformer 13, the secondary winding 14 of a transformer 15 and the secondary winding 16 of a transformer 17 to the cathode of electric valve 3. Transformers 13, 15 and 17 supply three components of voltage to the control member which determine the cycles and the instant in the cycles at which electric valve 8 is rendered conductive. Transformer 13 is provided with a primary winding 14 energized from a timer control, indicated generally by the numeral 18, to provide an alternating current turnon voltage in the secondary windings of transformer 13 which is substantially in phase with the anode voltages of electric valves 3 and 4. The timer circuit 18 is energized from the supply circuit under the control of an initiating switch 19. Transformer 15 supplies an alternating holdoff voltage to the control members of electric valves 8 and 9 and is provided with a primary winding 20 energized directly from the supply circuit 2. The primary winding 21 of transformer 17 is energized from the supply circuit 2 through a phase shifter, designated generally by the numeral 22, which may be adjusted to determine the phase relation of the peaked voltages induced in windings 14 and as a result the instant at which electric valves 8 and 9 are rendered conductive. The relative magnitudes of the voltage supplied by the secondary windings 12, 14 and 16 of transformers 13, 15 and 17 is such that the electric valves 8 and 9 are not rendered conductive by the presence of the turnon voltage in the windings 12 without the superimposed peak of winding 16. Thus the voltage of transformer 13 determines the cycles during which conduction may be initiated and the peaked voltage produced in the secondary windings 16 of transformer 17 determines the instant in the cycle that conduction is initiated. The system just described for supplying timed applications of current to the welding transformer exemplifies the type of system to which my invention may be applied to advantage.

In order to minimize the current demand on the supply circuit 2, I provide a bank of capacitors 23 which are connected to one end terminal of an auto-transformer 24 and one side of supply circuit 2 by conductor 25 and through a pair of reversely connected electric valves 26 and 27 to the other end terminal of the auto-transformer. An intermediate tap on transformer 24 is connected to the other side of the alternating current supply circuit 2. In order to pre-charge capacitors 23 to the crest value of the supply circuit voltage, I provide a rectifier including an electric discharge device 28 and a current limiting resistor 28a connected in series with the capacitor bank 23 and across the end terminals of the auto-transformer 24. A suitable resistor 24a, which may to advantage be of the type having an inverse current characteristic, is connected across the transformer 24 for limiting transient voltages.

The electric valves 26 and 27 are preferably of the type employing an ionizable medium and, as illustrated, each comprises an anode 29, a cathode 30 of conducting liquid, an immersion-ignitor type control member 31 and an auxiliary or holding anode 32. Since the energizing circuits for the starting electrodes 31 and holding anodes 32 for the electric valves 26 and 27 are identical, only one will be described and the same reference numerals will be employed to designate corresponding parts of the two excitation circuits.

Referring to the electric valve 26, the control member 31 is connected to be energized by current impulses supplied by the capacitor 33 under the control of an electric valve 34 through a circuit including in series a current limiting resistor 35 and a reactor 36 which serves to reverse the voltage on the anode-cathode circuit of electric valve 34 and permit the control member thereof to regain control after an impulse has been supplied to the control member 31. The reactor 36 also limits the rate of rise of current through the starting electrode 31. The capacitor 33 may be charged in any suitable manner and, as illustrated, is charged by a rectifier circuit including an electric discharge device 37 having the discharge path thereof connected in series with a current limiting resistor 38 and the secondary winding 39 of a transformer 40. The primary winding 41 of the transformer 40 is energized from a suitable source of alternating control power illustrated as a circuit 42, which may to advantage be energized from the supply circuit 2.

In order to render the electric valve 26 conductive during the intervals that the load circuit 1 is energized and at the proper point in the voltage wave of the supply circuit to avoid transient current flow, the control member 43 of the electric valve 34 is energized with a component of turnon voltage derived from the timer circuit 18 which determines the period of energization of the load circuit 1 and with an additional component of voltage which determines the instant of initiation of conduction. Referring now to the drawing, the circuit of the control member 43 may be traced through current limiting resistor 44, resistor 45, across which a peaked voltage is produced by the secondary winding 46 of a transformer 47, resistor 48, across which a negative or holdoff voltage is impressed, a resistor 49, across which a turnon voltage controlled by the timer 18 is impressed, and through conductor 50 to the cathode 30 of electric valve 26.

The voltage across resistor 49 is the rectified voltage of the secondary winding 51 of a transformer 52 having a primary winding 53 energized under the control of the timer 18 for cycles during which the load circuit is energized. The voltage of winding 51 is rectified by one discharge path of an electric discharge device 54 including an anode 55 and a cathode 56 and is impressed across resistor 49 to impress a positive voltage on control member 43. The voltage across resistor 48 is supplied by a secondary winding 57 of a transformer 58 having a primary winding 59 energized from the supply circuit 42. The voltage of winding 57 is rectified by the other discharge path of electric discharge device 54 including an anode 60 and the cathode 56 and is impressed on resistor 48 to impress a negative voltage on control member 43. The phase of the peaked voltages appearing across resistor 45 is determined by the phase of the voltage appearing across the output terminals 61 and 62 of a static phase shifting circuit including a midtapped secondary winding 63 of a transformer the primary winding 64 of which is energized from the alternating current supply circuit 42. A capacitor 65 and a resistor 66 are connected in series across the end terminals of winding 63 and the common terminal of these elements provides one of the output terminals 62. The voltage across the output terminals 61 and 62, which may be adjusted in phase by adjusting the magnitude of resistor 66, is impressed on a circuit including in series an adjustable resistor 67, a reactor 68, a capacitor 69 and primary winding 70 of the peaking transformer 47. Resistor 67 and primary winding 70 constitute a resistor peaker circuit and reactor 68 and capacitor 69 provide a filter for eliminating the undesirable effect of harmonic currents on the operation of the peaker. Filter capacitors 71, 72 and 73 are provided across resistors 45, 48 and 49, respectively, and transient suppression capacitors 74 and 75 are connected respectively between opposite ends of the resistor 44 and the cathode of electric valve 34.

In order to maintain the electric valve 26 in a conductive condition after an impulse is supplied to the starting electrode 31, the holding or excitation anode 32 is provided. As illustrated in the drawing, anode 32 is energized through a circuit including the secondary winding 76 of transformer 77, a current limiting resistor 78 and an uncontrolled electric discharge device 79. The primary winding 80 of transformer 77 may to advantage be energized from the supply circuit 42.

In order to protect the capacitor bank 23 from over-voltage, I provide a discharge gap 81 which is connected across the capacitor bank 23 through a circuit including a resistor 82 and the trip coil 83 of a circuit breaker 84 having contacts connected in the supply circuit 2. The breaker 84 is normally held in closed position by a latch 85 which is tripped by energization of the trip coil 83.

The features and advantages which characterize my invention will be better understood from a brief description of the operation of the illustrated embodiment. With the circuit breaker 84 closed and all of the cathodes of the electric valves at operating temperature, the system may be placed in operation by closing the initiating switch 19. As is readily understood, the timer 18 functions to supply alternating current voltage to the windings 12 which is in phase with the respective anode-cathode voltages of electric valves 8 and 9. This voltage determines the cycles during which electric valves 8 and 9, and as a result electric valves 3 and 4, conduct. Since the polarity of the pre-charged capacitors 23 must be correlated with the polarity of the first half cycle of voltage impressed on the load circuit, it is essential that the timer control 18 be of the type which initiates energization of the load circuit always on the same half cycle. Any of the numerous known timing control circuits of this type may be employed, for example the circuit of Fig. 1 of Garman Patent 2,190,514 granted February 13, 1940, and assigned to the assignee of the present invention. The instant in each half cycle that conduction is initiated is determined by the phase position of the peaked voltages produced in the secondary winding 46 of transformer 47.

As soon as the timer 18 is effective to produce a voltage in the secondary windings 12, a voltage is also produced in the secondary windings 51 of transformer 52. These voltages are rectified and impressed across the resistors 49 of the excitation circuits associated with electric valves 26 and 27. These turnon voltages place the excitation circuits in condition to render electric valves 34 conducting at the occurrence of a peaked voltage in the windings 46. For the purpose of the present invention, the phase shifting circuit energizing the primary winding 70 of the peaking transformer 47 is adjusted so that these voltages occur at substantially the 90° point in the supply circuit voltage wave. Electric valves 34, and as a result electric valves 26 and 27, are rendered conductive for the same number of cycles that the electric valves 3 and 4 are rendered conductive to connect capacitor bank 23 across the end terminals of auto-transformer 24 which is, in turn, connected across supply circuit 2. In this way the capacitor bank which has previously been pre-charged to the crest voltage of the supply circuit is switched with zero current transient and is effective to improve the power factor of the load imposed on the supply circuit 2.

Since just previous to the operation of switching valves 26 and 27 the voltage across the capacitor 23 is equal to the instantaneous voltage appearing across transformer 24, it is apparent that in order to condition electric valves 26 and 27 for conduction it is necessary to use separate excitation circuits; that is, circuits in which the voltage for the firing valves is derived from an auxiliary source rather than from the anodes of the electric valves with which they are associated. This voltage is produced by capacitors 93 in the illustrated embodiment. Also, since the impulse supplied to the starting electrodes 31 may be of short duration, it is desirable to provide the voltage of anode 32 so that electric valves 26 and 27 remain ready for conduction until the positive voltage is permanently established. This avoids extinction of the tubes due to any transients that may occur due to imperfections in the adjustment of the circuit.

As is well understood by those skilled in the art, it is common practice to energize a plurality of welders from a single supply circuit and to interlock these welders so that only one may be energized at a time. In such a system, it is equally apparent that a single bank of shunt capacitors may be employed for power factor correction purposes, and that it is only essential that the control for the capacitor bank be initiated each time that any one of the welders is placed in operation.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a lagging power factor load circuit, means for energizing said load circuit from said supply circuit intermittently, a capacitor, means for precharging said capacitor to substantially the crest voltage of said supply circuit, and circuit controlling means for connecting said precharged capacitor for energization from said supply circuit and in shunt with said load circuit for intervals corresponding to the intervals of energization of said load circuit, said last mentioned means including means completing said connection at substantially the positive maximum of the voltage wave impressed on said load circuit.

2. In combination, an alternating current supply circuit, a lagging power factor load circuit, means for supplying timed applications of alternating current to said load circuit from said supply circuit, a capacitor, means for precharging said capacitor to substantially the crest voltage of said supply circuit, circuit controlling means for connecting said precharged capacitor for energization from said supply circuit and in shunt with said load circuit for intervals corresponding to the intervals of energization of said load circuit including electric valve means having a control electrode, and means independent of said first mentioned means for controlling the energization of said control electrode to render said valve means conductive at substantially the first voltage maximum of the voltage wave of said supply circuit occurring during a period of energization of said load circuit.

3. In combination, an alternating current supply circuit, a lagging power factor load circuit, means for energizing said load circuit from said supply circuit intermittently, a capacitor, means for precharging said capacitor to substantially the crest voltage of said supply circuit, circuit controlling means for connecting said precharged capacitor for energization from said supply circuit and in shunt with said load circuit for intervals corresponding to the intervals of energization of said load circuit, said last mentioned means including a pair of pool-type electric discharge devices reversely connected in parallel and each provided with a starting electrode, means independent of the voltage across said discharge devices for energizing said starting electrodes, and means for synchronizing the energization of said control electrodes with the supply circuit voltage to initiate conduction of said discharge devices at substantially the maximum of the voltage wave impressed on said load circuit.

4. In combination, an alternating current supply circuit, a lagging power factor load circuit, means for energizing said load circuit from said supply circuit intermittently including a pair of reversely connected electric valve means each having a control electrode, a capacitor, circuit controlling means for connecting said capacitor for energization from said supply circuit and in shunt with said load circuit including a pair of electric discharge devices reversely connected in parallel and each provided with a control member, excitation circuits connected respectively with the control electrodes of said electric valve means and the control members of said electric discharge devices, timing means for controlling the energization of said excitation circuits to maintain said electric valve means and said electric discharge devices conductive for a predetermined number of half cycles of said supply circuit, and means individual to each of said excitation circuits for independently synchronizing the instant of initiation of conduction by said electric valve means and said discharge devices with the voltage of said supply circuit.

5. In combination, an alternating current supply circuit, a lagging power factor load circuit, means for energizing said load circuit from said supply circuit intermittently including a pair of reversely connected electric valve means each having a control electrode, a capacitor, circuit controlling means for connecting said capacitor for energization from said supply circuit and in shunt with said load circuit including a pair of electric discharge devices reversely connected in parallel and each providing a control member, excitation circuits connected respectively with the control electrodes of said electric valve means and the control members of said electric discharge devices, timing means for controlling the energization of each of said excitation circuits to maintain said electric valve means and said electric discharge devices conductive for a predetermined number of cycles of said supply circuit, and means individual to each of said excitation circuits for independently synchronizing the instant of initiation of conduction of said electric valve means and said discharge devices to effect the transmission of current to the load circuit having the desired root-mean-square value and to connect said capacitor to said supply circuit at an instant corresponding to a voltage maximum of said supply circuit.

6. In combination, an alternating current supply circuit, a lagging power factor load circuit, means for energizing said load circuit from said supply circuit intermittently including a pair of reversely connected electric valve means each including a control electrode, a capacitor, means for precharging said capacitor to substantially the crest voltage of said supply circuit, circuit controlling means for connecting said precharged capacitor for energization from said supply circuit and in shunt with said load circuit including a pair of pool-type electric discharge devices reversely connected in parallel and each provided with a starting electrode, means independent of the voltage across said discharge devices for energizing said starting electrodes, timing means for controlling said last mentioned means and the energization of the control electrodes of said electric valves to determine the cycles of the supply circuit voltage during which said load circuit is energized and the cycles during which said capacitor is connected to said supply circuit, means for synchronizing the energization of said starting electrodes with the supply circuit voltage to initiate conduction of said discharge devices at substantially the 90° point in the voltage wave of said supply circuit, and means independent of said last mentioned means for energizing the control electrodes of said electric valve means to initiate energization of said load circuit at any desired point in the voltage wave of said supply circuit.

ORRIN W. LIVINGSTON.